United States Patent [19]

Vollrath et al.

[11] Patent Number: 4,850,638

[45] Date of Patent: Jul. 25, 1989

[54] CROSS-BEAM FOR A MOTOR VEHICLE BODY

[75] Inventors: Johannes Vollrath; Rolf Lechler, both of Neckarsulm, Fed. Rep. of Germany

[73] Assignee: Audi A.G., Fed. Rep. of Germany

[21] Appl. No.: 48,089

[22] Filed: May 11, 1987

[30] Foreign Application Priority Data

Jun. 5, 1986 [DE] Fed. Rep. of Germany ....... 3618951

[51] Int. Cl.[4] .............................................. B62D 25/08
[52] U.S. Cl. .................................. 296/187; 296/203; 296/29; 296/194
[58] Field of Search ................ 293/132, 133; 296/187, 296/188, 189, 191, 193, 194, 195, 196, 197, 203, 29, 204

[56] References Cited

U.S. PATENT DOCUMENTS

| | | | |
|---|---|---|---|
| 2,612,233 | 9/1952 | Newell | 296/194 X |
| 2,998,280 | 8/1961 | Barenyi | 296/188 |
| 3,108,836 | 10/1963 | Deckert | 296/204 |
| 3,162,478 | 12/1964 | Richards | 296/204 |
| 3,168,344 | 2/1965 | Barenyi | 293/126 X |
| 3,730,575 | 5/1973 | Arlauskas et al. | 296/76 X |
| 3,926,463 | 12/1975 | Landwehr et al. | 296/189 X |
| 4,359,120 | 11/1982 | Schmidt et al. | 296/189 X |
| 4,373,665 | 2/1983 | Dietzsch | 296/189 X |
| 4,406,343 | 9/1983 | Harasaki | 296/194 X |
| 4,438,971 | 3/1984 | Zaydel et al. | 296/191 |
| 4,573,734 | 3/1986 | Gass | 296/189 |
| 4,613,184 | 9/1986 | Rispeter et al. | 296/194 X |

FOREIGN PATENT DOCUMENTS

| | | | |
|---|---|---|---|
| 683437 | 3/1964 | Canada | 296/197 |
| 124369 | 11/1986 | Japan | 296/204 |
| 353636 | 5/1961 | Switzerland | 296/194 |
| 868577 | 5/1961 | United Kingdom | 296/197 |

Primary Examiner—Russell D. Stormer
Attorney, Agent, or Firm—Kane, Dalsimer, Sullivan, Kurucz, Levy, Eisele and Richard

[57] ABSTRACT

A front or rear cross-beam of a motor vehicle body is fastened to the front or rear ends of the longitudinal members of the body or chassis, and acts to support the side parts or panels and of the body work. The cross-beam comprises a center section which is fastened to the longitudinal members, and lateral sections which are detachably fixed at the two sides of the central section and to which the side panels of the body are secured.

9 Claims, 2 Drawing Sheets

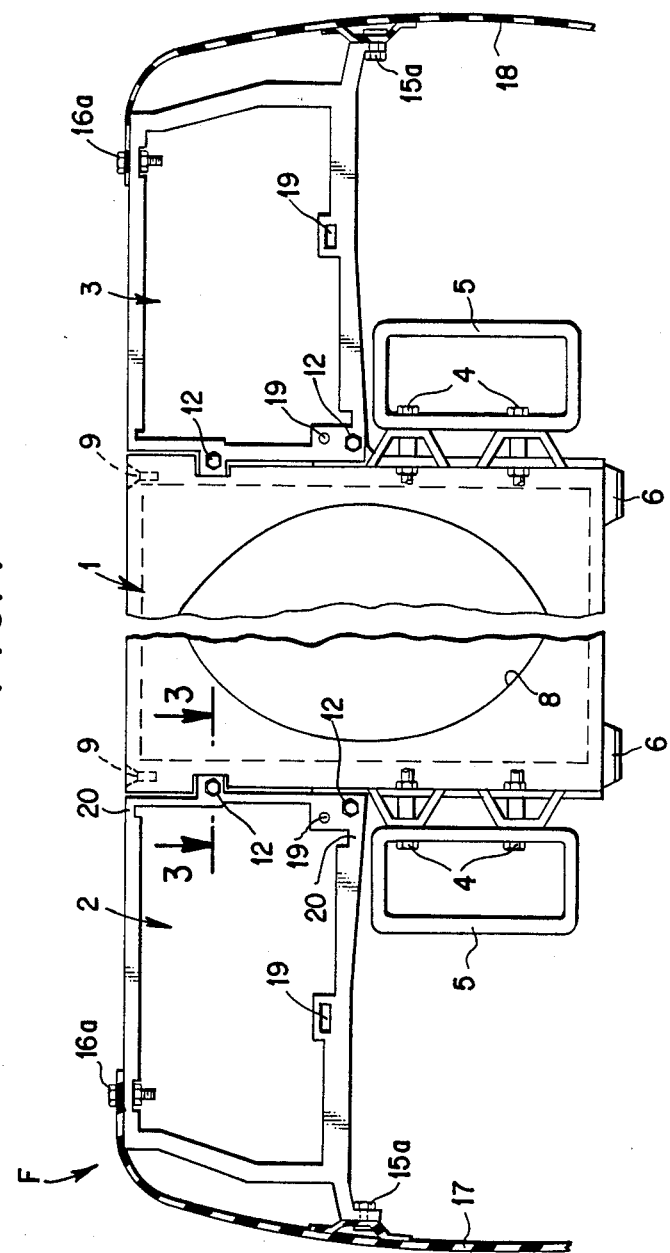

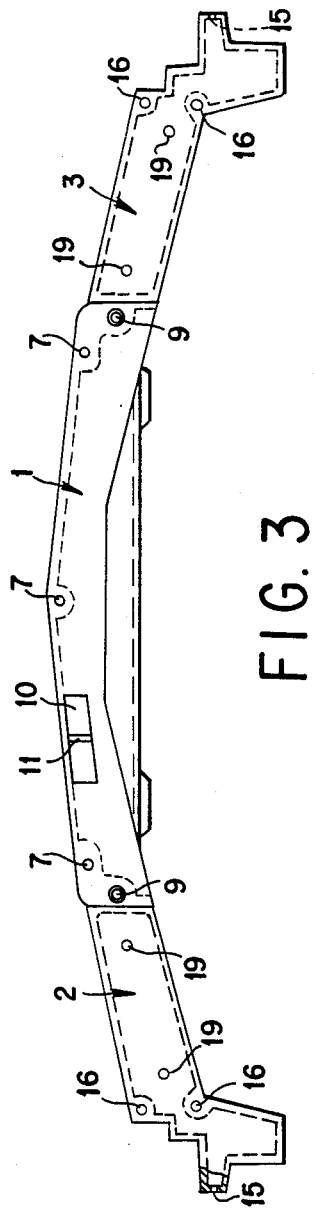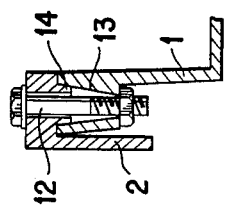

CROSS-BEAM FOR A MOTOR VEHICLE BODY

This invention relates to a front or tail cross-beam for a motor vehicle body, which is fastened to the front or rear ends of longitudinal members of the body or chassis, and acts to interconnect the side members or panels of the body.

A prior known front cross-beam of this type (see, for example, French Pat. No. 24 81 218) was constructed in one unit and also included the bumper underneath a section which accommodates the radiator and headlamp units. A contruction of this type, which combines in one unit a plurality of individual members which are usually manufactured from sheet metal, is certainly advantageous for the vehicle manufacturer in production and assembly, but can cause considerable expense to the user in the event of minor damage, since the entire cross-beam has to be replaced even with a relatively slight accident, and even if only one part of the same is damaged.

An object of the invention is to provide a front or tail cross-beam which can not only be manufactured at reasonable expense and is therefore of interest to the vehicle manufacturer, but is also favourable from the repair point of view and also satisfies other wishes and needs of the customer.

Broadly stated the invention consists in a front or tail cross-beam of a motor vehicle body which connects the side members or panels of the vehicle structure and is fastened to the front or rear ends of the longitudinal members of the body or chassis the cross-beam comprising a central section which is fastened to both longitudinal members and lateral sections which are detachably fixed at the two sides of the central section and to which the side members or panels are fastened.

The invention is based on the discovery or knowledge that accidents in which the vehicle sustains lateral damage at the front end account for over 50% of the total number of accidents. Hitherto in such cases it has been necessary to replace the entire cross-beam but by use of a cross-beam according to the invention only the relevant lateral section has to be removed and replaced by a new one. Repair costs are thus considerably reduced and by comparison with a one-part cross-beam the increased assembly expenditure is negligible, since it is quite possible to fasten the lateral sections to the central section by only two screws which is hardly of any consequence in fully automatic assembly procedures. On the other hand, there is considerable advantage in easier handling of smaller parts instead of a large cumbersome component which takes up the entire width of the vehicle. Moreover, the moulds for the smaller parts are considerably cheaper if these parts are formed as plastic mouldings or light metal castings, which is preferable, since by this means a good dimensional accuracy of these parts is obtained, and in consequence the bodywork can be assembled so as to be completely free of distortion and stress and the signs of fatigue which can usually be observed because of internal stress are avoided.

The lateral sections may be designed as partly hollow box structures to receive lighting units, or they may even consist of the actual housings for the lighting units. As a result there is provided in a very simple way, the possibility of carrying out modifications to the vehicle model (so-called face-lifting) at quite low cost. By using the housing of a lighting unit as a lateral section, made possible by appropriate choice of material, the components or frames which are usually necessary for holding the lighting units,can be eliminated. Lighting types of the type which are themselves cushioned are preferred for this purpose. Likewise, instead of lighting units, other components, for example, oil coolers, can be integrated in one or both lateral sections of the cross-beam.

As already mentioned, the main purpose of the invention is to provide an improved front or tail cross-beam which is favourable from the repair point of veiw, in order to keep the repair costs as low as possible. A further preferred feature of the invention assists in this, by providing predetermined breaking points in the lateral sections close to the points where they are fastened to the central section.

By means of these predetermined breaking points it is ensured that in the event of a lateral impact at the front end which involves only one front corner of the vehicle, the relevant lateral section is likely to break off, so that the risk of damage to the centre section and components integrated therein, such as coolers, ventilators and suchlike, is reduced.

The invention may be performed in various ways and one specific embodiment will now be described by way of example with reference to the accompanying drawings, in which:

FIG. 1 is a front view of a cross-beam according to the invention, in which the centre part of the centre section is broken away for convenience, FIG. 2 is a top plan view of the front cross-beam of FIG. 1, and FIG. 3 is a section on the line 3—3 through a connecting point between the centre section and a lateral section of the front cross-beam.

In FIGS. 1 and 2 is illustrated a front cross-beam of a motor vehicle, which comprises a centre section 1 and lateral sections 2 and 3 fixed at its two sides. The centre section 1 is fastened by means of bolts 4 to the front ends of body or chassis longitudinal members 5. It includes brackets 6 and screwholes 7 for fastening a radiator (not illustrated), an opening 8 to accept a ventilator (also not illustrated), openings 9, into which the locking bolts of the engine bonnet pass, and also an opening 10 with a stay 11 to accept the catch hook of the engine bonnet. Each lateral section 2 or 3 is connected to the centre section merely by two bolts 12, the connecting points being constructed as shown in FIG. 3. The centre section 1 has, for each fastening bolt 12, a conical bore 13, in which a corresponding conical shoulder or boss 14 of the lateral section 2 engages. The design thus provides accurate fixing of the lateral sections 2 and 3 in relation to the centre section 1.

The lateral sections 2 and 3 are provided with holes 15 and 16 for bolts or screws 15a and 16a for securing the bodywork side panels 17 and 18. Each lateral section 2 and 3 is framelike in construction in this illustrated example and is provided with holes 19 to take screws for fixing complete lighting units. The framelike lateral sections 2 and 3 can be of very thin-walled construction, i.e. with a wall thickness of 3 to 4 mm. for example, since they get their strength or dimensional stability by fitment of the lighting units. Alternatively, the lateral sections 2 and 3 may even consist of appropriately constructed actual lighting unit housings. This considerably simplifies the construction of the crossbeam. In this case it is advantageous to use lighting units which are themselves cushioned in the housing which forms an integral part of the cross-beam, in order to prolong the life of the lamp filaments.

As statistics have confirmed in more than 50% of all accidents only the front left-hand or right-hand corner of the vehicle is damaged. The direction of impact is indicated in FIG. 1 by the arrow F. In the event of a bump of this type, only the lateral section 2 is involved in the case of the illustrated front cross-beam, and this can now easily be replaced by loosening the bolts 12. To reduce even further the possibility of damage to the centre section with the appliances located therein, the frame of each lateral section 2 and 3, close to the point where it is fastened to the centre section 1, is formed with predetermined breaking points which in this example take the form of weak points 20 in the frame. Thus in the event of an impact from the side and towards the front, the frame of the relevant lateral section breaks off at the point 20, so that the effect of the impact on the centre section 1 is reduced to a mininum.

The centre section and the lateral sections are preferably formed of plastic, or as light metal castings, which if necessary are reinforced with fibre in known manner. The advantage of such castings lies in the fact that they have great dimensional precision, as a result of which deformations of the bodywork during assembly, which may lead to signs of fatigue, are avoided.

In addition to its advantages in case of repair, a cross-beam according to the invention offers further important benefits and improvements. For repair, replacement, or maintenance purposes, or even for modification of vehicle model, the basic shape of the cross-beam can be retained, and frequently only the style of the lighting units needs to be modified, which can be done without great expense. It is also possible to incorporate auxiliary coolers or radiators, for example, in the lateral sections, if the lighting units are located at some other position on the vehicle.

A front cross-beam of a motor vehicle is illustrated in the drawings. It should, however, be pointed out that the tri-section cross-beam of the invention can also be designed as a tail cross-beam, where basically the same advantages arise. Even a driving accident resulting from an emergency turn on the part of the driver can often result merely in damage to one side of the tail of the vehicle, so that when a cross-beam according to the invention is used, only the relevant lateral section has to be replaced.

We claim:

1. A cross-beam for a motor vehicle body construction, the motor vehicle body construction comprising longitudinal chassis members:
   wherein the cross-beam interconnects side panels of the vehicle body;
   wherein said cross-beam comprises a central section which is fastened to adjacent ends of the chassis members and has two lateral ends, and two lateral sections each having two ends and being detachably fastened at one end to one end of said central section and forming a lateral extension thereof beyond the adjacent chassis member, and said side panels being detachably fastened to the other ends of said lateral sections so that in the event of lateral impact of the vehicle body adjacent a lateral section, the adjacent lateral section need only be detached if damaged and replaced without removal of the other lateral section if free of damage from the impact and central section if free of damage from the impact.

2. A vehicle body cross-beam as claimed in claim 1, in which the lateral sections are formed with predetermined breaking points at positions close to where they are fastened to the central section so that in the event of lateral impact of the vehicle body adjacent a lateral section, the adjacent lateral section breaks off at the breaking points so that the effect of lateral impact on the central section is reduced to a minimum.

3. A vehicle body cross-beam as claimed in claim 1, in which the lateral sections are designed as frames part of which are hollow to accept complete lighting units.

4. A vehicle body cross-beam as claimed in claim 1, in which the lateral sections constitute housings for complete lighting units.

5. A vehicle body cross-beam as claimed in any one of claims 1, 2, 3 or 4, in which the central section has at lest one opening for accepting a ventilator.

6. A vehicle body cross-beam as claimed in any one of claims 1, 2, 3 or 4, in which the central section and the lateral sections are formed as plastic mouldings.

7. A vehicle body cross-beam as claimed in any one of claims 1, 2, 3 or 4, in which the central section and the lateral sections are formed as light metal castings.

8. A vehicle body cross-beam as claimed in any one of claims 1, 2, 3, or 4 in which the central sections has at least one opening for accepting means for mounting a cooler or radiator.

9. A vehicle body cross-beam as claimed in any one of claims 1, 2, 3, or 4 in which the central section has at least one opening for accepting means for positioning an engine hood locking mechanism.

* * * * *